Dec. 15, 1959  C. T. MURPHY  2,916,847
ANIMAL TRAP
Filed March 22, 1957  2 Sheets-Sheet 1
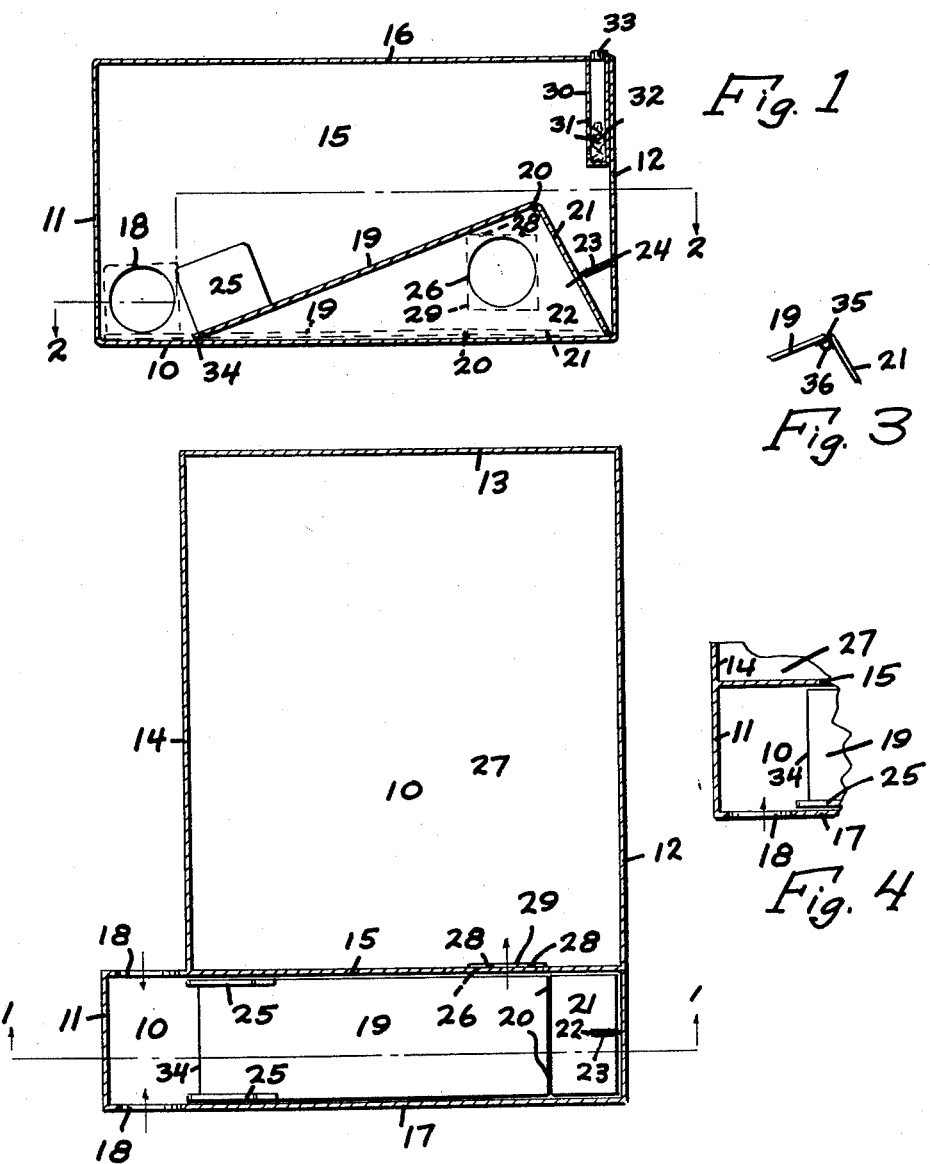
INVENTOR.
Charles T. Murphy
BY Sam J. Slotsky
ATTORNEY Dec. 15, 1959  C. T. MURPHY  2,916,847
ANIMAL TRAP
Filed March 22, 1957  2 Sheets-Sheet 2
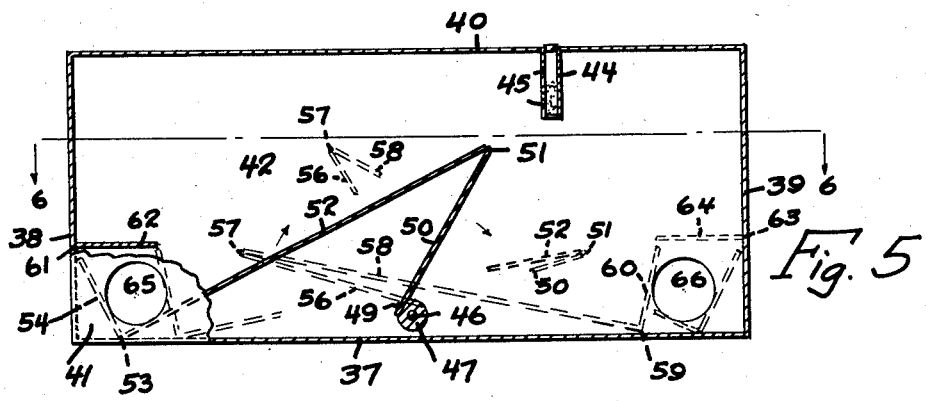
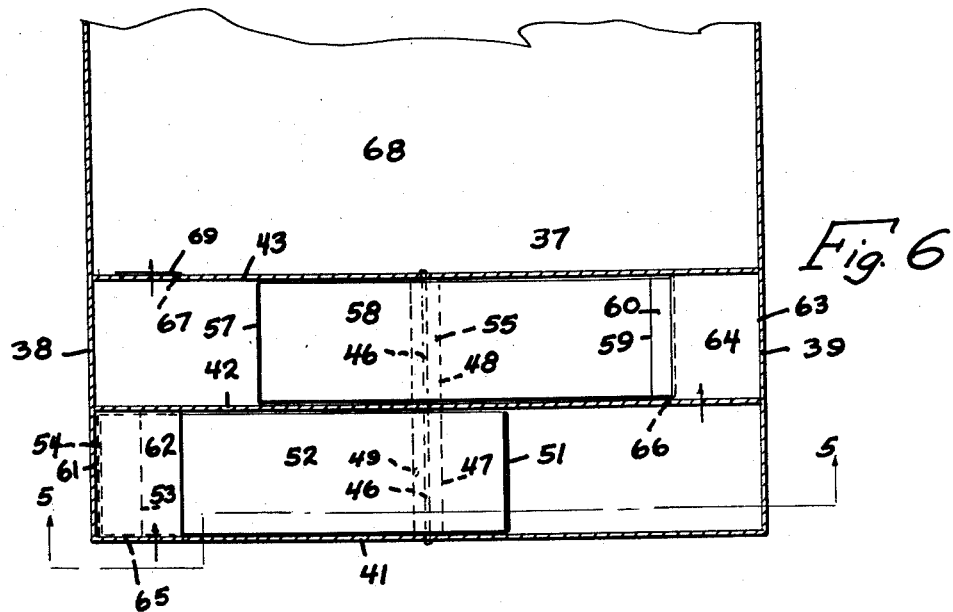
INVENTOR.
Charles T. Murphy
BY Sam J. Slotsky
ATTORNEY

United States Patent Office 2,916,847
Patented Dec. 15, 1959

2,916,847

ANIMAL TRAP

Charles T. Murphy, Onawa, Iowa

Application March 22, 1957, Serial No. 647,816

4 Claims. (Cl. 43—61)

My invention relates to an animal trap, which is more particularly to be used for mice or rats, although it can be used for any other animal.

An object of my invention is to provide a simple device which will entrap the animal after it has entered the trap, and which will automatically open the trap after the animal has passed into a further entrapping enclosure.

A further object of my invention is to provide a very simple construction, and which can be manufactured at a reasonable cost.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional view of one form of the trap taken along the lines 1—1 of Figure 2, Figure 2 is a sectional view taken along the lines 2—2 of Figure 1, Figure 3 is a modification, Figure 4 is a further modification, Figure 5 is a modification of a preferred form showing a sectional view taken along the lines 5—5 of Figure 6, and Figure 6 is a sectional view of Figure 5 taken along the lines 6—6 of Figure 5.

My invention contemplates the provision of an automatic animal trap whereby entrance of the animal into the trap will cause the entrance openings to be closed due to the weight of the creature and whereby exit of the animal into a further compartment will cause the openings or opening to be re-opened for the next animal.

I have used the character 10 to designate the base of the trap, it being understood that the base or the walls of the device can be made of any suitable material, and I have further used the character 11 to indicate an end wall, the character 12 a lengthened further end wall, the character 13 a vertical wall, and the character 14 a further vertical wall which joins the still further vertical wall 15, which wall 15 joins the wall 12. The character 16 indicates a top wall which is the top wall for the entire arrangement. The character 17 indicates a further forward vertical wall.

The walls 15 and 17 include a pair of opposite circular openings 18. I have further used the character 19 to indicate a treadle which is suitably hinged at 20 to a further plate 21 to which is secured at 22 a fairly weak coiled spring 23 which is attached at 24 to the wall 12, and secured to the treadle 19 at one end as shown are a pair of vertically positioned flanges 25.

Formed in the wall 15 is a further opening 26 which provides entrance into the chamber 27 which is provided by the walls 12, 13, 14, and 15 as well as the top and bottom walls, and hinged at 28 to the wall 15 is a relatively light square door or flap 29.

A small container 30 having the openings 31 can be provided and which can contain cheese 32 or any other edible, the container having the closure 33, it being understood, however, that any other baiting arrangement can be employed.

The operation of the trap is as follows. The animal which is attracted by the odor, etc. of the bait will enter either of the openings 18 and will then start to walk up the treadle 19 toward the bait 32. As soon as the weight of the animal is on the treadle 19, the lower end 34 of the treadle will slide toward the left, until the treadle 19 and plate 21 will lie practically flat, or in the dotted position shown in Figure 1, and at the same time the flanges 25 will close the openings 18, so that the animal cannot escape through these openings.

As soon as the treadle is in the horizontal position, the opening 26 will be accessible to the animal who can easily push through the door 29 and will enter into the chamber 27. As soon as the animal enters the chamber 27, the spring 23 will draw the treadle and plate 21 to the upper position shown, leaving the openings 18 clear for the next creature to enter, and as a result, several animals can be trapped. Any type of lid can be provided in the chamber 27 for emptying the trap of the creatures when desired. It should be understood that any type of chamber 27 can be employed.

Figure 3 illustrates a slightly modified form wherein a hinge pin 35 is used with the usual hinges, and a small torsion spring 36 receives this pin and is secured to the members 19 and 21.

Figure 4 illustrates a still further modification which is identical in all respects with the exception that a single opening 18 is used, requiring only a single flange 25.

Figures 5 and 6 illustrate a preferred modification wherein the character 37 indicates the base of the trap, the characters 38 and 39 indicating side walls, the character 40 indicating a top wall, the character 41 indicating an end wall, and the characters 42 and 43 indicating vertically positioned spaced partitions. The character 44 indicates a bait receiving member having the openings 45.

The character 46 indicates a transversely positioned shaft passing through the partitions 42 and 43 to which shaft are attached the cylindrical members 47 and 48. Attached at 49 to the member 47 is the elongated plate 50 which is hinged at 51 to a further plate or treadle 52 which is bent upwardly at 53 into the end flange 54.

Similarly, attached at 55 to the cylindrical member 48 is a further plate 56 which is positioned between the partitions 42 and 43, and hinged at 57 to the plate 56 is a further treadle 58 which is bent upwardly at 59 into the end flange 60, it being noted that this arrangement is identical to the treadle arrangement 50 and 52 except in opposed relation.

Attached to the side wall 38 at 61 is the horizontally positioned wall 62, and attached at 63 (see Figure 6) to the side wall 39 is a further horizontally positioned wall 64.

Passing through the end wall 41 is the circular opening 65, and passing through the partition 42 is the opening 66, and passing through the partition 43 directly opposite to the opening 65 is a further circular opening 67 (see Figure 6) which communicates into the enclohure portions 68 which can include any suitable type of lid and the like for emptying the trap of the mice when desired.

The operation of the disclosure shown in Figures 5 and 6 is as follows. When the mouse enters the opening 65 and passes upwardly along the treadle 52 towards the bait, the treadle will swing toward the right and downwardly in the direction of the arrow and to the dotted position shown, which will correspondingly raise the treadle arrangement 56 and 58 to the dotted position shown. The flange 54 will occupy the dotted position shown, and in combination with the wall 62 prevents the animal from passing back through the opening 65, and the animal will then pass over the hinged portion at 51, the flange 60 then being in the dotted position shown; and the animal will pass through the opening 66 and will travel up the treadle 58. At this point the weight of the animal will cause the treadle 58 to occupy the position shown by the dotted lines in Figure 1, which in turn will again raise the treadle 52 and the plate 50 to the open position as shown by the solid lines, ready for the next creature, and in this way the animal will re-set the trap. The flange 60 in combination with the plate 64 will block the opening 66, and the animal will then travel over the hinged portion 57, through the opening 67 into the enclosure 68. A thin flap valve 69 can be hinged over the opening 67 to prevent the animal from returning.

It will be understood that slight modifications can be made without departing from the essential spirit of my invention, and it will now be noted that I have provided the various advantages mentioned in the objects of my invention.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An animal trap comprising a vertically positioned enclosure, a pair of opposed openings in said enclosure for admitting an animal therein, a spring biased treadle in said enclosure, said treadle being normally positioned angularly, said treadle including a pair of vertically positioned flanges at its normally lower end, the weight of an animal on said treadle adapted to position said treadle horizontally and downwardly whereby said flanges will close said openings, a plate hinged to said treadle, and at an angle thereto, spring means attached between said plate and to one end of said enclosure.

2. An animal trap comprising a vertically positioned enclosure, an opening in said enclosure for admitting an animal therein, a spring biased treadle in said enclosure, said treadle being normally positioned angularly, said treadle including a vertically positioned flange at its normally lower end, the weight of an animal on said treadle adapted to position said treadle horizontally and downwardly whereby said flange will close said opening, a plate hinged to said treadle, and at an angle thereto, spring means attached between said plate and to one end of said enclosure.

3. An animal trap comprising a vertically positioned enclosure, a pair of opposed openings in said enclosure for admitting an animal therein, a spring biased treadle in said enclosure, said treadle being normally positioned angularly, said treadle including a pair of vertically positioned flanges at its normally lower end, the weight of an animal on said treadle adapted to position said treadle horizontally and downwardly whereby said flanges will close said openings, a plate hinged to said treadle, and at an angle thereto, spring means attached between said plate and to one end of said enclosure, the lower end of said plate normally abutting against the bottom of said enclosure.

4. An animal trap comprising a vertically positioned enclosure, a pair of opposed openings in said enclosure for admitting an animal therein, a spring biased treadle in said enclosure, said treadle being normally positioned angularly, said treadle including a pair of vertically positioned flanges at its normally lower end, the weight of an animal on said treadle adapted to position said treadle horizontally and downwardly whereby said flanges will close said openings, a plate hinged to said treadle, and at an angle thereto, spring means attached between said plate and to one end of said enclosure, the lower end of said plate normally abutting against the bottom of said enclosure, said trap including an animal receiving chamber, a further opening normally positioned beneath said treadle and allowing entrance into said chamber after said treadle has been positioned horizontally.

References Cited in the file of this patent

UNITED STATES PATENTS

| | | |
|---|---|---|
| 1,625,027 | Hulse | Apr. 19, 1927 |
| 1,722,321 | Atwell | July 30, 1929 |
| 2,229,685 | Swedenburg | Jan. 28, 1941 |